United States Patent
Berens

[15] 3,672,690
[45] June 27, 1972

[54] BIDIRECTIONAL HYDRODYNAMIC SHAFT SEAL

[72] Inventor: Alfred S. Berens, Farmington, Mich.

[73] Assignee: Federal-Mogul Corporation, Southfield, Mich.

[22] Filed: May 25, 1970

[21] Appl. No.: 40,144

[52] U.S. Cl. ........................................................277/134
[51] Int. Cl. .................................................F16j 15/32
[58] Field of Search.................................................277/134

[56] References Cited

UNITED STATES PATENTS

| | | | |
|---|---|---|---|
| 3,561,770 | 2/1971 | Corsi | 277/134 X |
| 1,811,588 | 6/1931 | Moreau | 277/134 |
| 2,446,380 | 8/1948 | Meyers et al. | 277/134 X |
| 2,985,551 | 11/1960 | Rogers | 277/134 X |
| 3,504,918 | 4/1970 | Halliday | 277/134 |
| 3,504,919 | 4/1970 | Halliday et al. | 277/134 |
| 3,504,920 | 4/1970 | Halliday | 277/134 |
| 3,515,395 | 6/1970 | Weinand | 277/134 |
| 3,534,969 | 10/1970 | Weinand | 277/134 X |

FOREIGN PATENTS OR APPLICATIONS

| | | | |
|---|---|---|---|
| 1,954,972 | 5/1970 | Germany | 277/134 |
| 499,480 | 1/1939 | Great Britain | 277/134 |
| 1,342,278 | 9/1963 | France | 277/134 |

Primary Examiner—Samuel B. Rothberg
Attorney—Owen, Wickersham & Erickson

[57] ABSTRACT

A shaft seal of the bidirectional hydrodynamic type with flutes that meet the sealing band or lip edge tangentially, the flutes being continuous and providing for hydrodynamic return of oil that has leaked past the lip edge. The continuous flutes are readily and accurately provided during molding in a seal having an as-molded lip edge.

8 Claims, 11 Drawing Figures

PATENTED JUN 27 1972
3,672,690
SHEET 1 OF 4
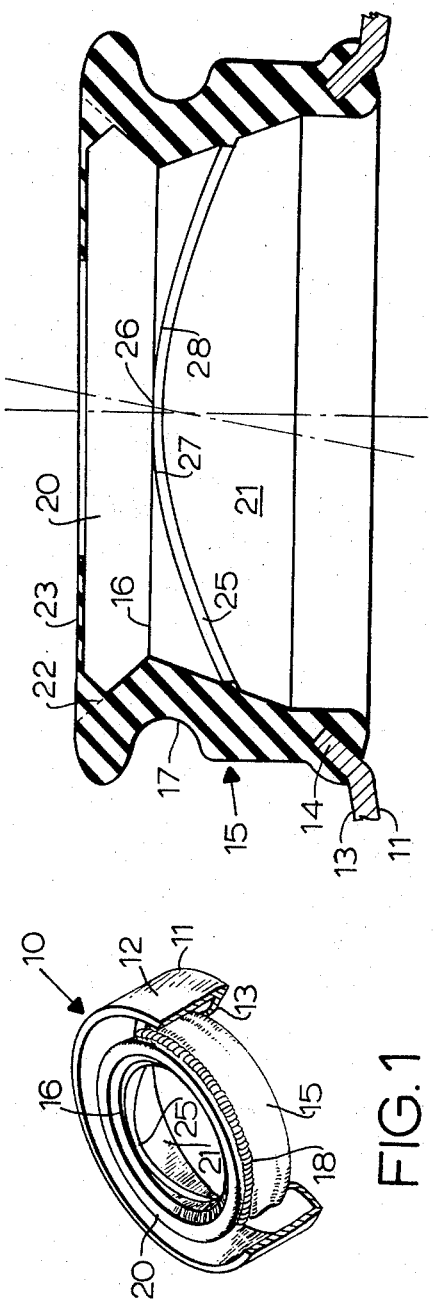
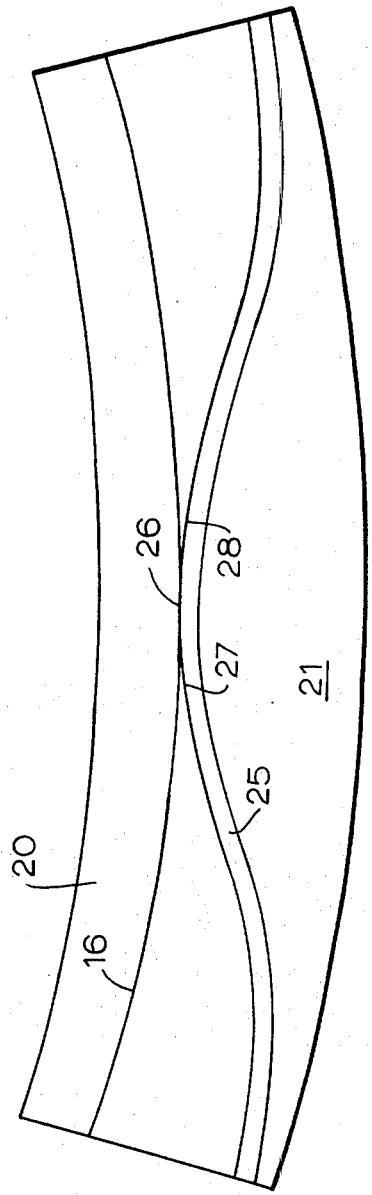
INVENTOR.
ALFRED S. BERENS
BY
Owen, Wickersham & Erickson
ATTORNEYS

*INVENTOR.*
ALFRED S. BERENS
BY
*Owen, Wickersham & Erickson*
ATTORNEYS

INVENTOR.
ALFRED S. BERENS
BY
Owen, Wickersham & Erickson
ATTORNEYS

INVENTOR.
ALFRED S. BERENS
BY
Owen, Wickersham & Erickson
ATTORNEYS

BIDIRECTIONAL HYDRODYNAMIC SHAFT SEAL

This invention relates to bidirectional hydrodynamic shaft seals. Such seals are exemplified by U.S. Pat. Nos. 3,504,918; 3,504,919 and 3,504,920, issued to George Angus and Company, Limited. Basically, these seals are shaft seals of the lip type having an outer (air side) frustoconical surface that is provided with helical ridges, grooves, or flutes which obliquely meet the sealing band or lip edge in opposite peripheral directions, respectively, at a small angle, not more than 20° and preferably between 1° and 5°, to provide a fluid feedback effect in either direction of shaft rotation.

The seal exemplified by the recently issued patent can be made to do its job well, but it is rather critical in its operations. When the seal structure is sought to be made by trimming the lip, there are inaccuracies which cannot be tolerated except where the shaft interference can be quite large. Consequently, it is preferable to form the sealing band or lip edge as an as-molded surface. This creates special problems, both in the construction of the mold and in the resulting seal.

For example, in one type of bidirectional hydrodynamic seal having flutes, several flutes are molded in the approach surface of the seal so as to obliquely intersect the sealing or contact band, sometimes known as the static band. The mold may be made in the conventional manner except for the grooves required to form the flutes or ribs. The grooves may be formed by turning in a lathe, in which the die member is rotated about an axis slightly oblique to its own longitudinal axis. The circular grooves so turned, and the resulting molded ridges, are mutually parallel, and the centers of their circles are successively offset from the axis of the frustoconical surface. Under this prior art design one or more of these grooves intersects with the trim line of the seal. The finished trimmed seals thus have one or more ribs intersecting the static lip or primary lip in two opposite circumferential directions, each individual rib intersecting the lip once in each direction. Where there is a plurality of ribs, they intersect the primary lip successively in one direction and successively in the opposite direction. A similar seal may be made by cutting a series of grooves in the mold so that each groove is radially spaced from the other so as to produce an alternating pattern of intersections with the primary lip, first in one direction and then the opposite direction and continually alternating. Where the seal lips are to be trimmed, such structure presents no problem to a skilled mold maker. However, molded-lip molds are much more difficult to make, since the prior art grooves cannot, in that form of structure be continuous. The mold corner required to produce the molded primary lip interferes with any continuous milling or cutting operation.

While two-piece molds or cores can be made, they are expensive and are not fully satisfactory in production. Whether the joint be bolted, brazed, or otherwise held together, that joint between the two pieces of the mold tends to leak rubber, resulting in unacceptable flash at the primary lip, also known as the sealing band.

The present invention provides a seal structure particularly suitable to the formation of as-molded lips that are satisfactory and also have as-molded bidirectional hydrodynamic flutes.

A basic feature of the invention is that the hydrodynamic ribs or flutes that reach the primary lip are tangent to the sealing band or lip edge rather than intersecting it. This configuration enables the flutes to meet the sealing band or primary lip obliquely in opposing directions and provides a hydrodynamic effect in either direction of shaft rotation. The configuration also enables the use of a one-piece mold core, which is easily made by a skilled machinist, since the flutes do not extend beyond the mold corner and, being continuous, they can be cut or milled on a lathe in a continuous operation.

Other objects and advantages of the invention will appear from the following description of some preferred forms thereof.

In the drawings:

FIG. 1 is a view in perspective of a shaft seal embodying the principles of the invention, a portion of the case being broken away.

FIG. 2 is a fragmentary enlarged view in elevation and partly in section of the lip portion of the shaft seal of FIG. 1.

FIG. 3 is a developed view of the surface of the complete inner periphery of the seal of FIGS. 1 and 2.

Figures 5, 6:
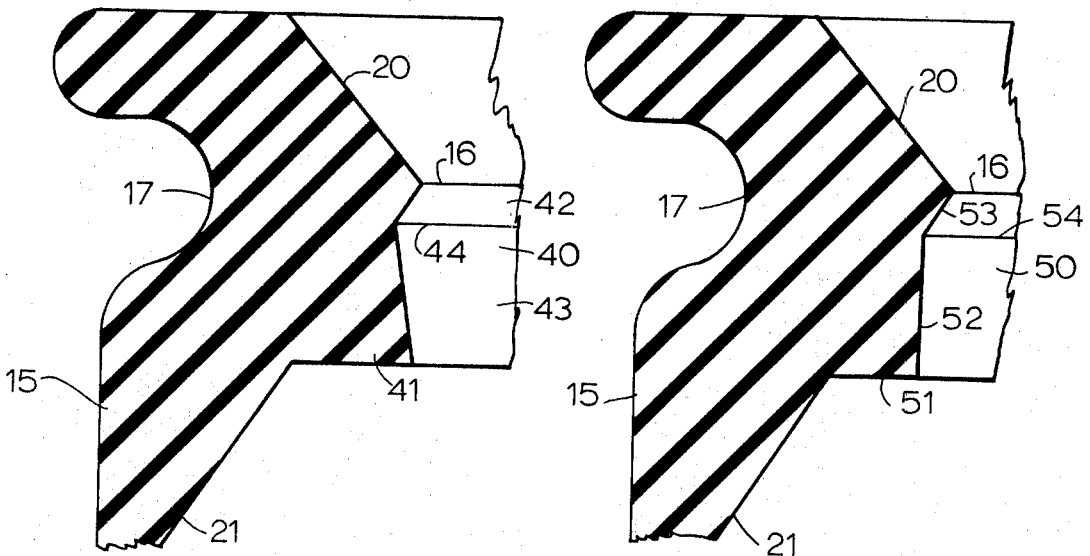
FIG. 5 is an enlarged view in elevation and in section of the lip portion showing one form of flute structure.
FIG. 6 is a view similar to FIG. 5 of a modified form of lip structure.

In the seal of FIGS. 1 to 3 the shaft seal 10 comprises a metal reinforcing member 11 provided with a suitable bore-sealing cylindrical surface 12 either of metal or of elastomer coating on the metal. A radially inwardly extending flange 13 is used to provide an anchor portion 14 to which an elastomeric body 15 is molded and bonded. This body 15 comprises a lip 16 and has a spring receiving groove 17 for a suitable garter spring 18. The lip 16 is the intersection of two convergent frustoconical surfaces 20 and 21, the surface 20 facing towards and the surface 21 away from the fluid sealing or oil side of the seal 10. The seal 10 as shown in FIG. 2 has not been completed, though a trim line 22 is indicated; instead, the body 15 is shown in one of its possible as-molded shapes, in which there is a hat-like portion 23 that is to be trimmed off but is formed during the molding by the flow of excess elastomer. FIG. 2 thus shows how the seal 10 can be molded so that the primary lip 16 or sealing band is defined in the mold as the meeting point of the frustoconical surfaces 20 and 21. The sealing band 16 is continuous and is co-axial with the molded body 15 and the cylindrical case surface 12. It may be termed the static sealing lip or primary lip of the seal. This lip is generally of the kind present in most shaft seals, and its formation and shape may be relatively conventional.

The invention differs from conventional seals by its use of at least one flute 25, to provide a bidirectional dynamic seal, in other words, to return across the sealing band 16 any oil or other liquid which has managed to leak across the sealing band 16, whether due to a defect in the sealing band 16 itself or in the shaft on which it seals. As can be seen from FIGS. 1 to 3, the flute 25 meets the sealing band 16 and leaves it tangentially. It does not cross the sealing band 16. It is continuous and therefore lies at a variable angle relative to the lip 16, but it is easily provided on a mold, for example, by a lathe. Being tangent at just one point 26, it is evident that at this point the bidirectional principle is operating, so that depending on the direction of rotation, either the portion 27 of the flute 25 leading into the tangency 26 or that portion 28 which leaves the tangency 26 is operating as the hydrodynamic member to return the fluid.

Figure 4:
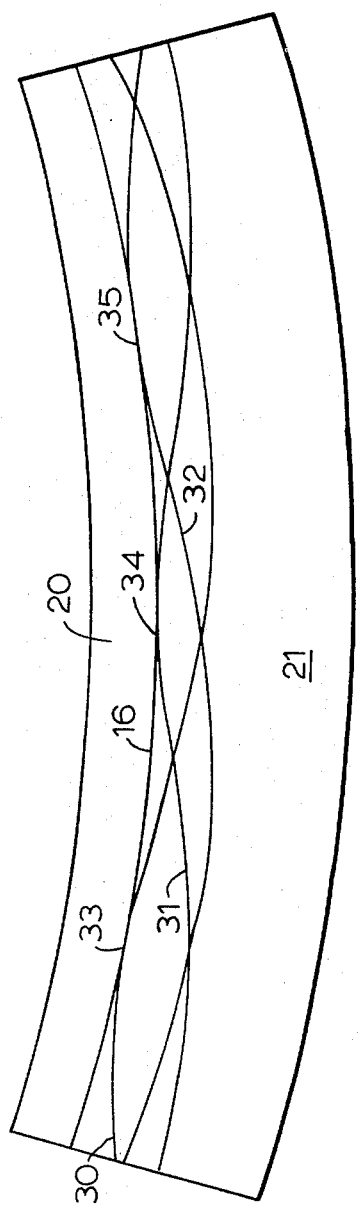
FIG. 4 is a view similar to FIG. 3 of a modified form of seal having a plurality of flutes.

While the single-flute structure shown in FIGS. 1 to 3 is satisfactory for some uses, better results are obtained if there is a plurality of flutes, such as is shown in the developed view of FIG. 4, in which a single line represents each flute. In this view there are three different flutes 30, 31, and 32 which meet the sealing band 16 at tangencies 33, 34, and 35, and the points of tangency are made to be substantially equally spaced around the seal, so that there are three points 33, 34, and 35 at which hydrodynamic action is retained in either direction of rotation, there being, in effect, six action points with only three of them in operation at any one time, depending on the rotational direction of the shaft relative to the seal.

Figure 11:
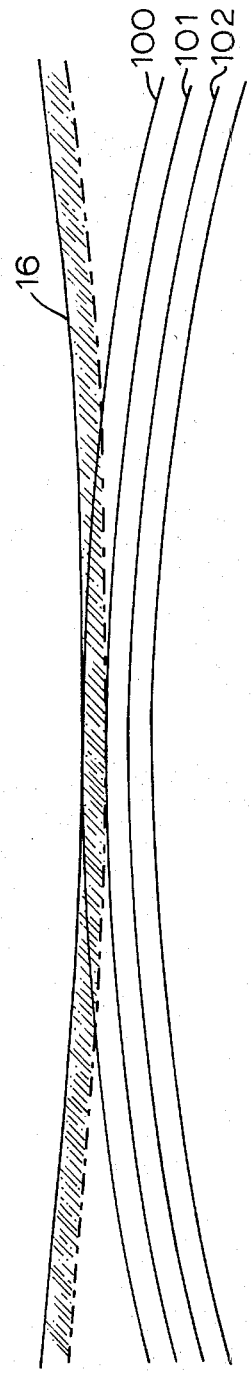
FIG. 11 is a fragmentary developed view of another modified form of seal having several parallel flutes.

It is also possible, as shown in FIG. 11, to have several parallel flutes, 100, 101, 102, each represented by a single line, the leading flute 100 being tangent to the narrow seal lip or band 16. In that instance only the tangent flute 100 is active when the seal is new, but one or more in each of the parallel groups becomes active as the seal wears and the sealing band 16 widens, as shown in FIG. 11 by the shaded portion. Thus, the flute 101 eventually becomes hydrodynamically operative. Further wear results in the flute 102 becoming active, and so on.

Various configurations of the individual flutes or ribs are feasible as shown in FIGS. 5-8, in which the flutes are shown greatly enlarged in size as compared with the rest of the seal. Thus, in FIG. 5 each flute 40 is formed by a projecting rib 41, which projects out from the normally frustoconical air side 21 of the seal and, due to the fact that it projects back at an angle, preferably of five to ten degrees, it provides a cavity or groove-like portion having one surface 42 that substantially follows the normal frustoconical shape 21 and another section 43 that meets that at a line 44, preferably at an obtuse angle, though it may meet at a different angle if desired.

FIG. 6 shows a somewhat similar form in which each flute 50 is formed by a wall 51 that in the as-molded shape projects directly radially and another wall 52 that is cylindrical, i.e., parallel to the surface of the shaft on which it is to seal. It meets a portion 53 of the wall 21 at a line 54. When this seal is put on the shaft, the shaft interference changes the angle and at some portions makes it approach somewhat the shape of the groove of FIG. 5. It will be understood, of course, that this section is taken in just one position and that at another position the shape would approach very close to the sealing lip or band 16.

Figures 7, 8:
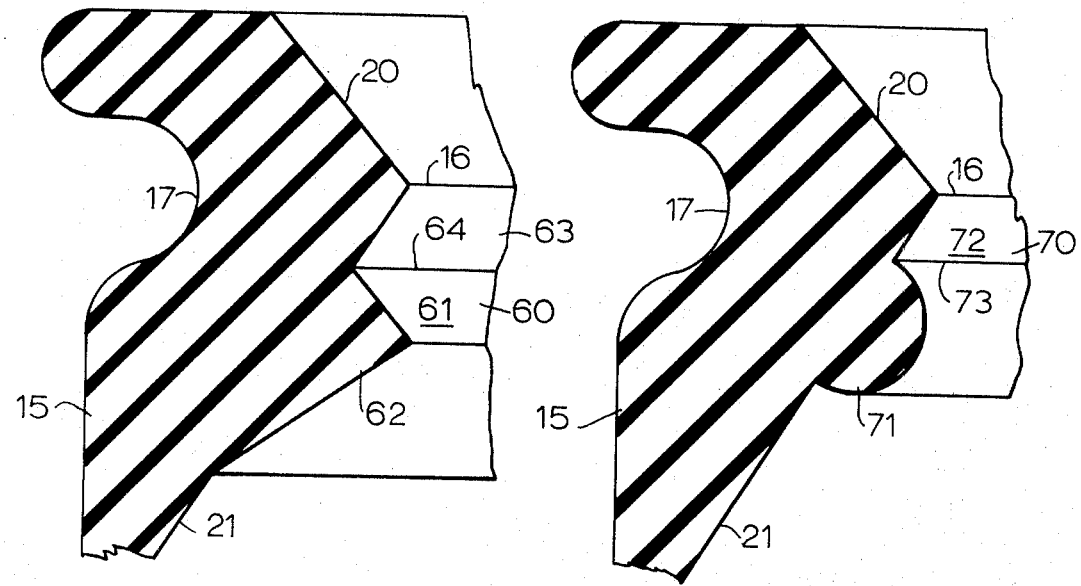
FIG. 7 is a view similar to FIG. 5 of another modified form of lip structure.
FIG. 8 is a view similar to FIG. 5 of another modified form of lip structure.

FIG. 7 shows another form of seal with a groove 60 in which a surface 61 of the projecting rib 62 lies substantially parallel to the oil side 20 of the seal and forms a groove between it and a portion 63 the normally frustoconical air side 21, which it intersects at a line 64.

FIG. 8 shows yet another form of seal of this invention in which a rib 71 that forms a flute 70 is substantially hemispherical, as a projection beyond the normal frustoconical surface 21. Here, again, a groove is formed between this hemispherical bead 71 and a portion 72 of the normal frustoconical wall 21, the bead 71 and portion 72 intersecting at a line 73. When provided according to the showing in FIGS. 1 through 3, duopositive hydrodynamic sealing is again obtainable.

Figure 9:
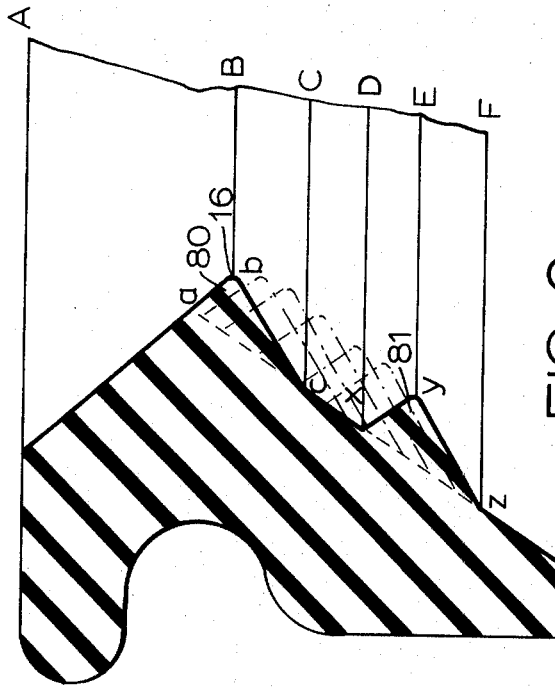
FIG. 9 is a view similar to FIG. 5 of yet another modified structure embodying the principles of the invention.
Figure 10:
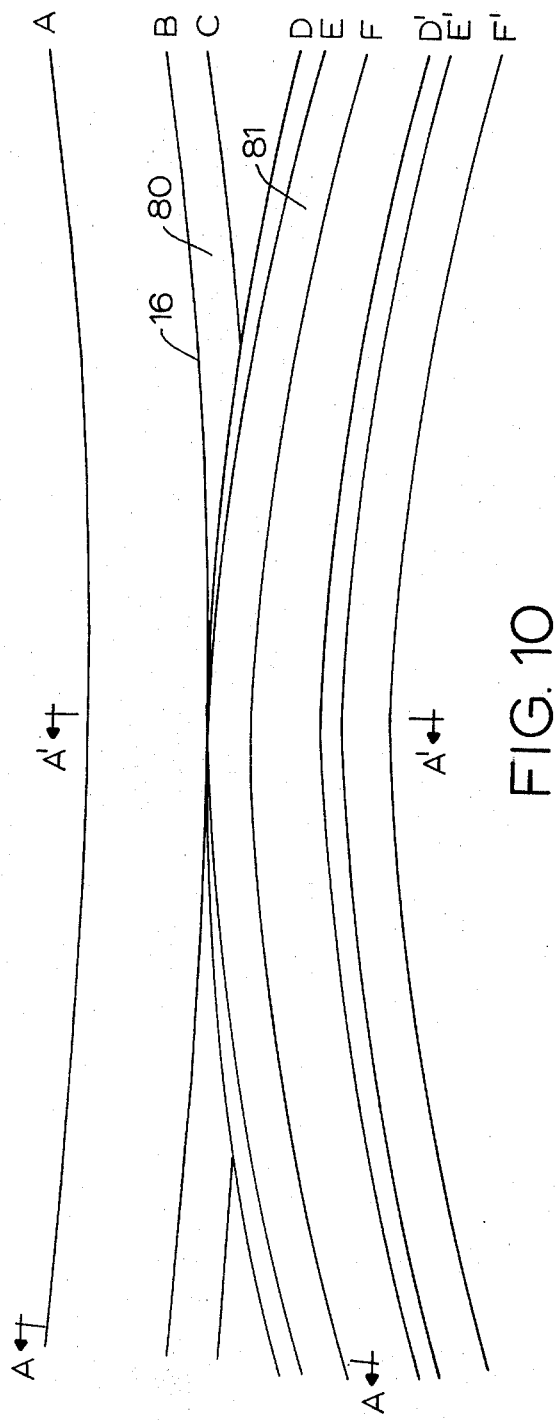
FIG. 10 is a partial view of the seal of FIG. 9 looking at FIG. 9 from the right.

A further refinement, which is desirable to establish an unbroken or continuous lip when the seal is new, is to have one flute concentric with the seal lip, as shown in FIGS. 9 and 10. The flute 80 preferably has the same cross section as the hydrodynamic flute and at no point does it have a smaller diameter than the smallest hydrodynamic flute diameter. This insures simultaneously a leak-free static seal and an active hydrodynamic action. FIG. 9 shows the sealing band, or lip edge 16 and a concentric flute 80. There, as previously described, one or more oblique flute 81 is tangent to the concentric flute 80. The most desirable practice would be to cut this concentric flute in the mold after generating the hydrodynamic flutes therein. As shown in FIG. 10, as the section A—A is moved around the circumference toward A'—A', the oblique flute 81 moves toward the static flute 80, as shown by the dotted flutes of FIG. 9, until at A'—A', the static and dynamic flutes 80 and 81 exactly coincide. As a result, the sections A—A and A'—A' are identical, and both look like FIG. 9. The letters A, B, C, D, E, and F, show in both views to give an identification of elements.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A shaft seal comprising
   a molded sealing ring of resilient material having a peripheral sealing lip with inner and outer mutually convergent, generally frustoconical surfaces respectively facing towards and away from the fluid-sealing side of the seal,
   a continuous circumferential sealing band co-axial with said ring and defined by the convergence of said frustoconical surfaces,
   said outer frustoconical surface having a plurality of hydrodynamic flutes, each flute being continuous and tangentially meeting said sealing band once only and tangentially leaving it once only, said flutes crossing each other, with their points of tangency being evenly spaced around said sealing band, said flutes being operative when the shaft is rotating relative to the seal in either direction to sweep back to said sealing band fluid that leaks past said sealing band.

2. The shaft seal of claim 1 wherein there is in addition at least one more continuous flute parallel to and spaced axially from each said continuous flute and having a larger diameter, so that as the sealing band wears, said one more flute becomes hydrodynamically active in place of the former flute and whereby there is a plurality of groups of parallel said flutes, with their actual and prospective points of tangency evenly spaced around said sealing band.

3. A bidirectional hydrodynamic shaft seal comprising,
   a rigid annular member, and
   a molded sealing member of elastomeric material supported by and bonded to said rigid annular member, said sealing member having a primary sealing lip for making circular contact with a shaft rotating relatively to said lip, said lip having a side that faces the liquid to be sealed and an air side that faces away from the sealed fluid,
   said air side having a generally frustoconical approach surface and having therein a plurality of continuous dynamic flutes projecting from said surface and spaced axially from each other and transversely oblique to the plane of said primary lip, a plurality of said dynamic flutes each meeting and leaving said lip tangentially at one single locus of tangency to provide hydrodynamic action when the seal is mounted on a rotating shaft, whichever is the direction of rotation.

4. The seal of claim 3 wherein each dynamic flute is accompanied by at least one parallel flute of somewhat larger diameter to become active as the seal wears.

5. The shaft seal of claim 3 wherein each said dynamic flute provides a frustoconical surface inclined to the plane of said primary lip at an angle of 3° to 7° and meeting said approach surface at an obtuse angle, the portion of each said dynamic flute that tangentially meets and leaves said lip coming into contact with the shaft and cooperating therewith and with said approach surface to define a wedge that traps leaked oil and returns it across said lip.

6. The shaft seal of claim 5 wherein each said flute is about 0.010 to 0.020 inch wide.

7. A shaft seal comprising
   a molded sealing ring of resilient material having a peripheral sealing lip with inner and outer mutually convergent, generally frustoconical surfaces respectively facing towards and away from the fluid sealing side of the seal,
   a continuous circumferential sealing band co-axial with said ring defined on said lip by the convergence of said frustoconical surfaces,
   said outer frustoconical surface having
   a continuous static flute parallel to and spaced from said sealing band and
   a plurality of continuous hydrodynamic flutes, each tangentially meeting said static flute and tangentially leaving it, at a single locus of tangency with their respective points of tangency evenly spaced around said static flute,
   said static flute having its inner diameter no smaller than the smallest inner diameter of said hydrodynamic flute,
   said hydrodynamic flutes being operative when the shaft is rotating relative to the seal in either direction to sweep back to said sealing band fluid that leaks past said sealing band.

8. The shaft seal of claim 7 wherein said static flute and said hydrodynamic flutes are identical in shape.

* * * * *